(12) United States Patent
Brake et al.

(10) Patent No.: US 10,936,814 B2
(45) Date of Patent: *Mar. 2, 2021

(54) RESPONSIVE SPELL CHECKING FOR WEB FORMS

(71) Applicant: International Business Machines Corporation, Armonk, NY (US)

(72) Inventors: Kyle M. Brake, Dublin, OH (US); Stephen A. Boxwell, Columbus, OH (US); Stanley J. Vernier, Grove City, OH (US); Keith G. Frost, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,339

(22) Filed: Jun. 27, 2019

(65) Prior Publication Data

US 2020/0226211 A1 Jul. 16, 2020

Related U.S. Application Data

(63) Continuation of application No. 16/244,945, filed on Jan. 10, 2019.

(51) Int. Cl.
| | | |
|---|---|---|
| *G06F 17/00* | (2019.01) | |
| *G06F 40/232* | (2020.01) | |
| *G06F 16/34* | (2019.01) | |
| *G06N 20/00* | (2019.01) | |
| *G06F 40/242* | (2020.01) | |

(52) U.S. Cl.
CPC .......... *G06F 40/232* (2020.01); *G06F 16/34* (2019.01); *G06F 40/242* (2020.01); *G06N 20/00* (2019.01)

(58) Field of Classification Search
CPC ...... G06F 40/232; G06F 16/34; G06F 40/242; G06F 3/0482; G06F 3/0485; G06F 40/109; G06F 3/165; G06N 20/00
USPC ........................................................ 715/257
See application file for complete search history.

(56) References Cited

U.S. PATENT DOCUMENTS

| | | |
|---|---|---|
| 6,006,183 A | 12/1999 | Lai |
| 6,175,834 B1 | 1/2001 | Cai |
| 6,865,258 B1 * | 3/2005 | Polcyn .................... G10L 15/26 |
| | | 379/88.01 |

(Continued)

OTHER PUBLICATIONS

"List of IBM Patents or Patent Applications Treated as Related," Letter from Leslie A. Van Leeuwen, Jun. 27, 2019, 1 page.

(Continued)

*Primary Examiner* — Jason T Edwards
(74) *Attorney, Agent, or Firm* — VanLeeuwen & VanLeeuwen; Alexander G. Jochym

(57) ABSTRACT

An approach is provided that receives words that are input by a user of an application with the words being displayed on a display device. Each of the words are compared to words from a dictionary. Based on the comparisons, words that are not found in the dictionary and only appear a single time are highlighted as being misspelled words. However, words that are not in the dictionary but appear multiple times in the document are highlighted differently to indicate that these words are possible misspelled words with the difference in highlighting allowing the user to easily discern between misspelled and possibly misspelled words.

7 Claims, 7 Drawing Sheets

(56) References Cited

U.S. PATENT DOCUMENTS

| | | |
|---|---|---|
| 7,313,516 B2 | 12/2007 | Oshima |
| 8,849,653 B2 | 9/2014 | Bauman et al. |
| 2005/0125217 A1* | 6/2005 | Mazor .................. G06F 40/232 704/1 |
| 2009/0067756 A1 | 3/2009 | Meyer |
| 2009/0182552 A1* | 7/2009 | Fyke .................... G06F 40/166 704/9 |
| 2009/0254818 A1* | 10/2009 | Jania .................... G06F 40/232 715/257 |
| 2009/0319258 A1 | 12/2009 | Shaer |
| 2015/0309984 A1 | 10/2015 | Bradford |
| 2016/0210280 A1 | 7/2016 | Tseng et al. |
| 2017/0103057 A1 | 4/2017 | Guerra |
| 2017/0365253 A1 | 12/2017 | Bradford et al. |
| 2018/0046331 A1 | 2/2018 | Monson |

OTHER PUBLICATIONS

Brake et al., "Responsive Spell Checking for Web Forms," U.S. Appl. No. 16/244,945, filed Jan. 10, 2019, 38 pages.

* cited by examiner

RESPONSIVE SPELL CHECKING FOR WEB FORMS

BACKGROUND OF THE INVENTION

Description of Related Art

A spell check is a well known and well understood type of software application that checks for misspelled words in text, such as in a document or other text input area. The text input area might be in a word processor, email client, web page, or other application. In recent years, spell checkers have become increasingly sophisticated; some are now capable of recognizing simple grammatical errors. However, even sophisticated spell checkers rarely catch every error in a text and sometimes flag correctly spelled words, such as neologisms and foreign words, as being misspelled. Nonetheless, spell checkers are often considered as a type of foreign language writing aid that non-native language learners can rely on to detect and correct their misspellings in the target language.

SUMMARY

An approach is provided that receives words that are input by a user of an application with the words being displayed on a display device. Each of the words are compared to words from a dictionary. Based on the comparisons, words that are not found in the dictionary and only appear a single time are highlighted as being misspelled words. However, words that are not in the dictionary but appear multiple times in the document are highlighted differently to indicate that these words are possible misspelled words with the difference in highlighting allowing the user to easily discern between misspelled and possibly misspelled words. The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
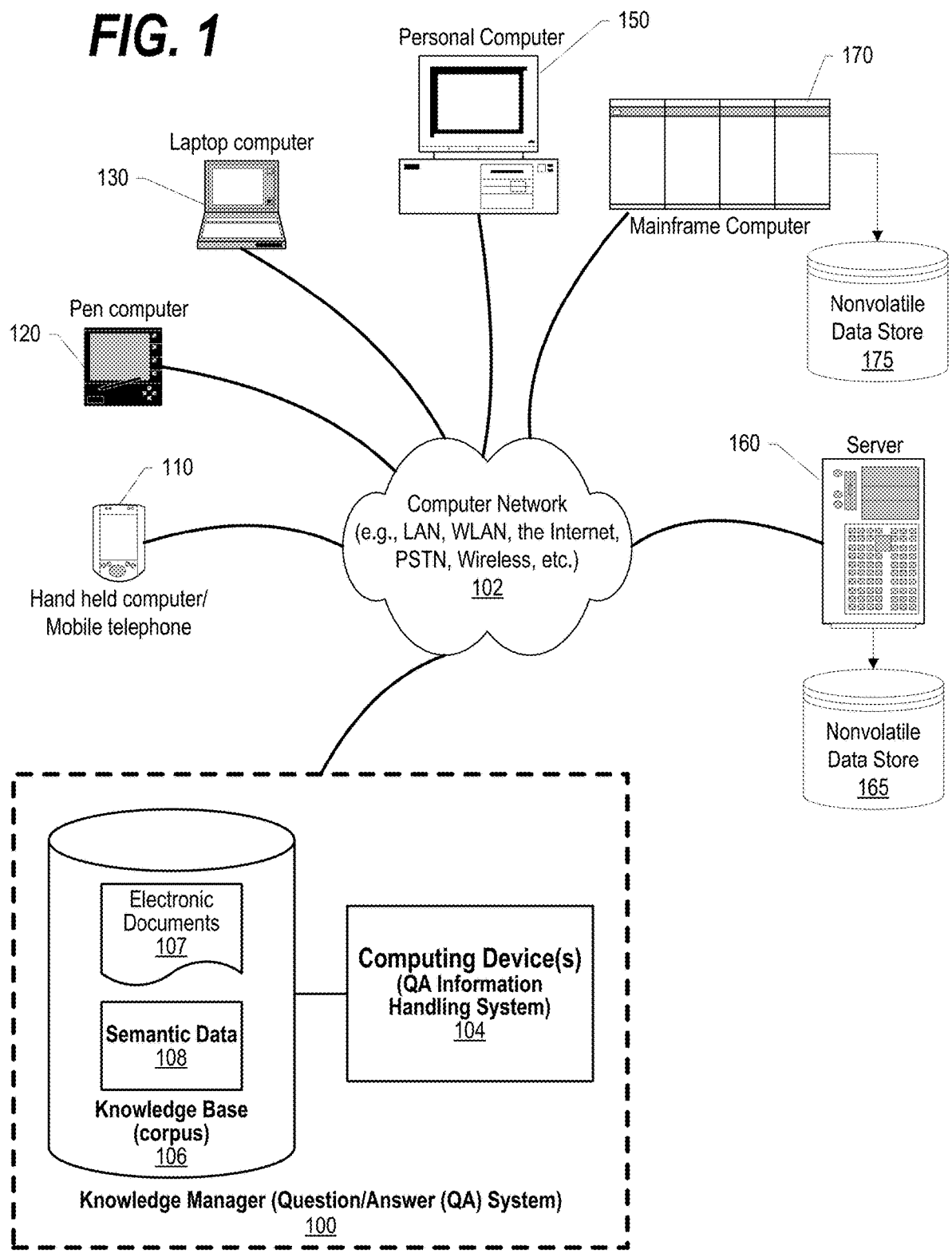
FIG. 1 depicts a network environment that includes a knowledge manager that utilizes a knowledge base.

FIGS. 1-7 describe an approach that provides a responsive spell checker for web forms. When filling out a form, it is not uncommon for words to be input that are outside of the software's dictionary. If spellchecking is enabled, the form could be riddled with underlined, "misspelled" words. Furthermore, because the software does not recognize an uncommon word, actual misspellings are not highlighted any more prominently than the correctly spelled words. The approach described herein strives to solve this problem through responsively adjusting the dictionary based on context of the form.

As an example, assume that a user is writing a wiki page for microservices. The title of the wiki page is set to "Microservices Guide". The browser's dictionary does not have "microservices" as a valid word so it's highlighted as being misspelled. The user continues writing about "microsrevices" notices that they have actually misspelled "microservices" because every instance of the word "microservices" is highlighted as a misspelling. This approach identifies that the first instance of a "misspelled" word is not corrected by the user and does not have any obvious common misspellings to correct it to. Upon the user typing in another instance of the "misspelled" word, the word is added to a temporary dictionary and all instances of the word are no longer highlighted as misspellings.

In one embodiment, the actual misspellings of the word in question are still highlighted as misspellings and are now more noticeable. Assume the user is writing an email message to a potential client named "Streve Boxmell." "Streve Boxmell, that was a fantastic presentation . . . ". "Streve" and "Boxmell" are considered a misspellings and are underlined as such throughout your message. You accidentally misspell "Boxmell" as "Boxwell" but don't notice since both are highlighted as misspellings. Receiving the resulting email, Streve is upset by the misspelling of his last name and the user's lack of attention to detail and the user then loses an important potential client.

This invention would prevent this issue by looking for exact matches to your "misspelled" word within the webpage. In this example, "Message to Streve Boxmell" was the line appearing before the textbox into which the user's message was typed. The instances of "Streve" and "Boxmell" within the body of the webpage would mean that when either word was input into the textbox, the misspelling checker would leave them alone and the user would notice the instance of "Boxwell" within the message.

First, the text input contains a misspelled word, "W." Second, the spellchecker determines whether the word "W" exists on the webpage. Third, if W exists elsewhere, the system adds W to a temporary dictionary. Fourth, if W does not exist, then the system does nothing. Fifth, the system marks all instances of W as temporary dictionary words. In one embodiment, this is configurable such as providing: no markings, different underline, etc.).

Inventive Advantages

The inventors have discovered a system that provides significant advantages over prior art systems. The inventors' system improves system accuracy when dealing with words not found in standard dictionaries (improves systemaccuracy). The system also prevents critical misspelling mistakes that can adversely affect a user or an organization (improved userinterfacewithcomputersystem) and saves both system and user resources by more accurately identifying correctly spelled versus misspelled words (reduces use of computingresources). In addition, preventing erroneous spelling errors to documents and text inputs prevents or reduces the amount of time and resources spent removing and correcting such erroneous inputs from such systems so that fewer computing resources, including system personnel, are needed to correct from such erroneous inputs (reduces use of computingresources).

Terminology and Scope

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
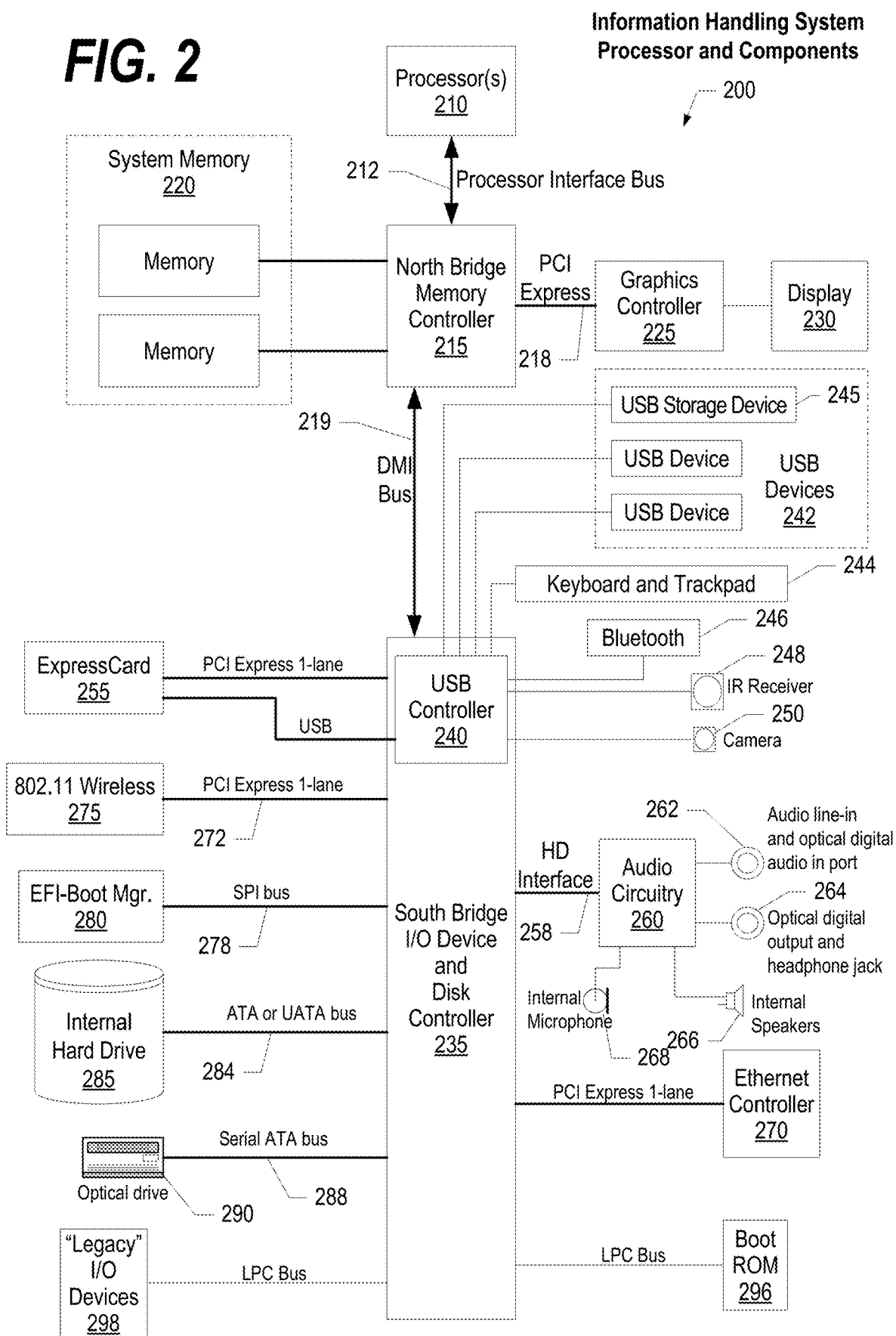
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
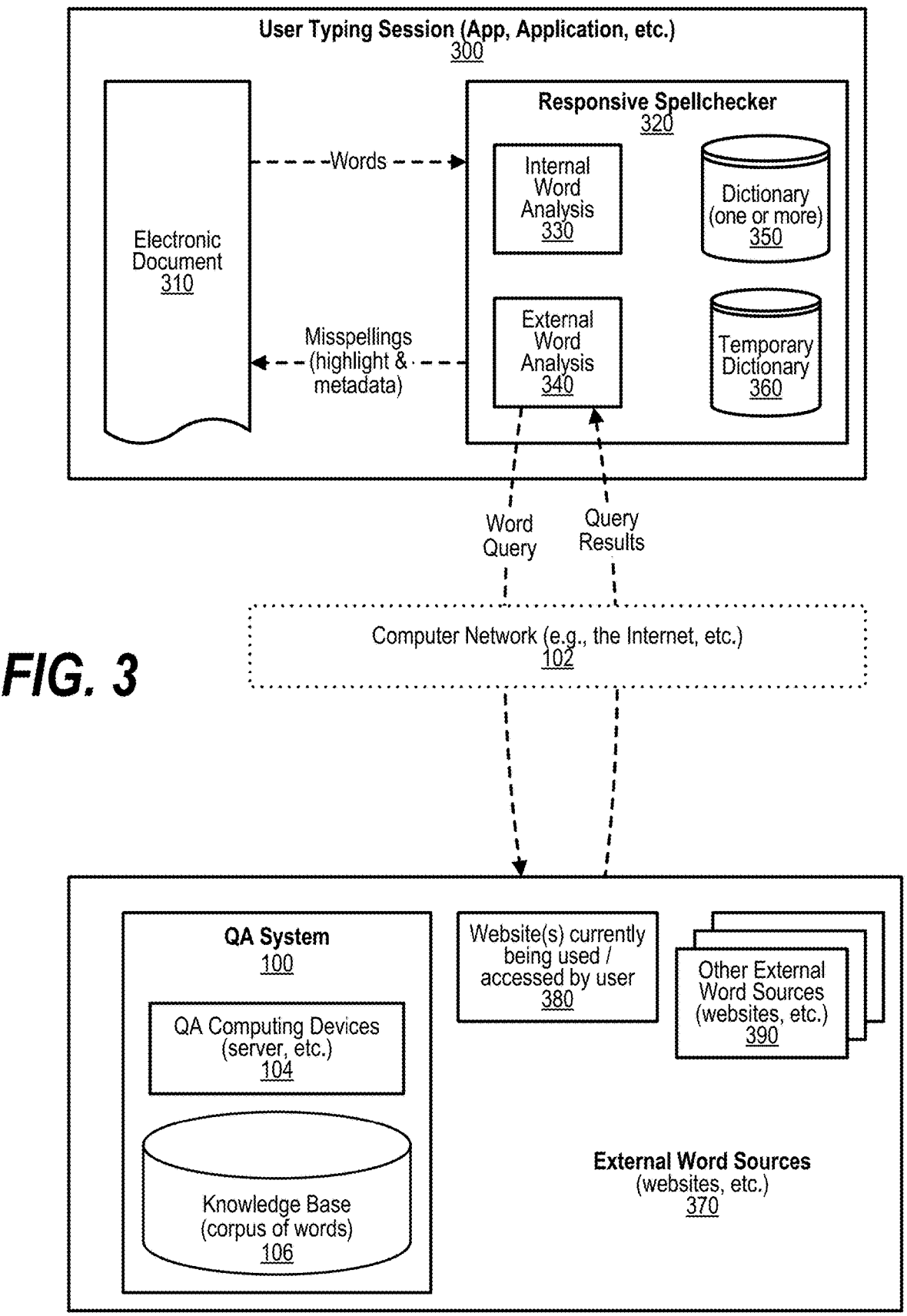
FIG. 3 is a component diagram that shows components utilized by a responsive spell checker for web forms.

FIG. 3 is a component diagram that shows components utilized by a responsive spell checker for web forms. User typing session 300 depicts a user entering data into electronic document 310, such as a word processing document, email, or any other type of document. Responsive spellchecker 320 provides both an internal and external word analysis. Internal word analysis 330 is performed by responsive spellchecker to check for other occurrences of possibly misspelled words in local data sources, such as internal to the document that is being typed. For example, if a term such as "microservices" is not found in dictionary 350 but this term is found multiple times in electronic document 310, then this word is highlighted differently than a word that is misspelled a single time, such as the user entering "sevrices" instead of "services" a single time. In this example, "microservices" would be highlighted differently than "sevrices" to indicate that "sevrices" is misspelled and that "microservices" is only possibly misspelled since the same word is found multiple times in electronic document 310. In one embodiment, the user can select possibly misspelled words (e.g., "microservices", etc.) and add such words to temporary dictionary 360 so that such words are no longer highlighted as being either misspelled or possibly misspelled.

In one embodiment, words that are identified as misspelled that are also similar, but different, from possibly misspelled words are highlighted even differently to alert the user that such words are likely misspelled. For example, if the user misspells "microservices" as "micorservices" then the occurrence of "micorservices" is highlighted differently than possibly misspelled words to alert the user that while the user might want to use the unknown (to the dictionary) word "microservices" he or she actually mistakenly typed "micorservices." Such easily overlooked mistakes, when not highlighted by the approach described herein, can be detrimental or embarrassing, especially if the misspelled word is an important person's name with whom the user is communicating.

In one embodiment, responsive spellchecker 320 also performs external word analysis 340 that accesses external electronic word sources 370 in order to try to find occurrences of words not found in local dictionary 350. Using the example from above, it is likely that one of the external electronic word sources has occurrences of the word "microservices" so that this word can be found and identified as a correctly spelled word. In one embodiment, such correctly spelled words are automatically stored in temporary dictionary 360 or used to update dictionary 350. External electronic word sources 370 can include websites 380 that are accessible over computer network 102, such as those currently being used or otherwise known to the user. External word sources can also include additional external word sources 390 that may not be familiar to the user. In one embodiment, a process is performed to ingest words from external electronic word sources into a machine learning system, such as question-answering (QA) system 100 with such words being ingested into the QA system's corpus 106.

Figure 4:
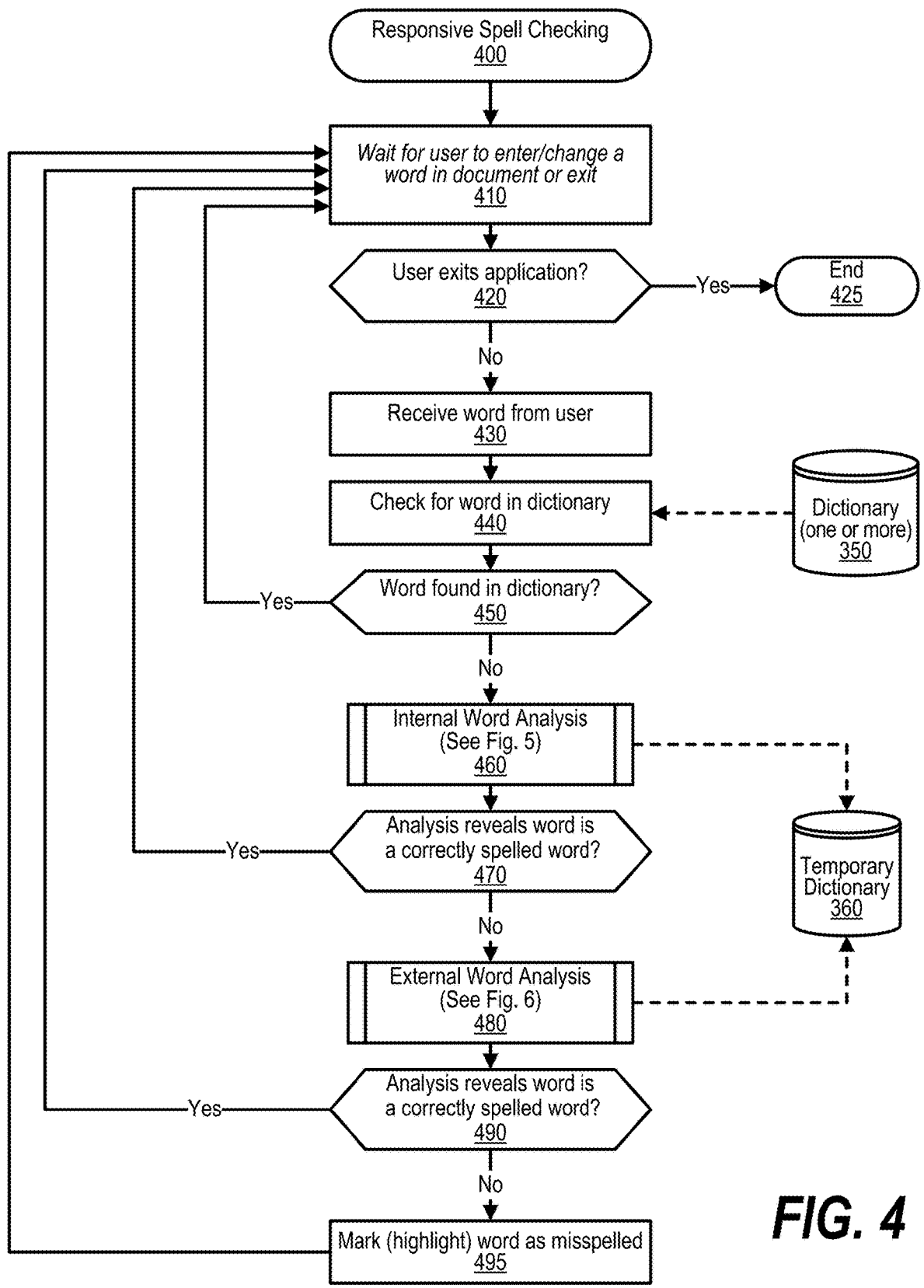
FIG. 4 is a depiction of a flowchart showing the logic performed by a responsive spell checking application.

FIG. 4 is a depiction of a flowchart showing the logic performed by a responsive spell checking application. FIG. 4 processing commences at 400 and shows the steps taken by a process that performs responsive spell checking. At step 410, the process waits for a user to enter or change a word in an electronic document or exit the application. The process determines as to whether the user exits the application (decision 420). If the user exits the application, then decision 420 branches to the 'yes' branch whereupon the process ends at 425. On the other hand, so long as the user continues using the application, then decision 420 continues to branch to the 'no' branch to receive and process the user's inputs as discussed below.

At step 430, the process receives a word from user. At step 440, the process checks for the word that was received from the user in electronic dictionary 350. The process determines as to whether the word entered by the user was found in the dictionary (decision 450). If the word entered by the user was found in the dictionary, then decision 450 branches to the 'yes' branch which loops back to step 410 to wait for the next word to be input by the user or for the user to exit the application. On the other hand, if the word entered by the user was not found in the dictionary, then decision 450 branches to the 'no' branch to perform steps 460 through 495.

Figure 5:
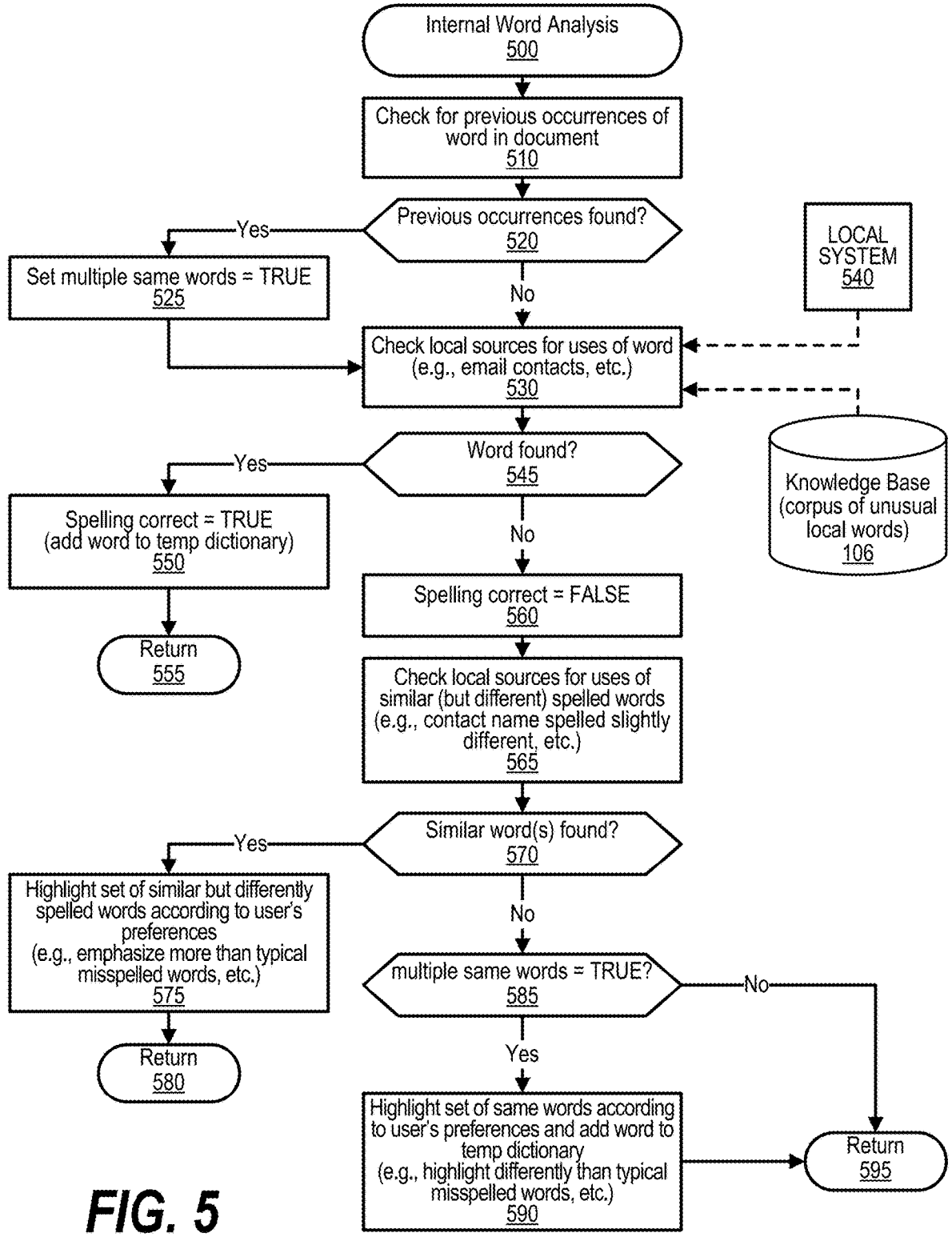
FIG. 5 is a depiction of a flowchart showing the logic used by a process that performs an internal word analysis.

At predefined process 460, the process performs the Internal Word Analysis routine (see FIG. 5 and corresponding text for processing details). This routine might store the word entered by the user into temporary dictionary 360. The process then determines as to whether the internal analysis reveals that the word entered by the user is a correctly spelled word (decision 470). If the internal analysis reveals that the word is a correctly spelled word, then decision 470 branches to the 'yes' branch which loops back to wait for the user to enter the next word or exit the application. On the other hand, if the internal analysis does not reveal that the word is correctly spelled, then decision 470 branches to the 'no' branch to perform steps 480 through 495.

Figure 6:
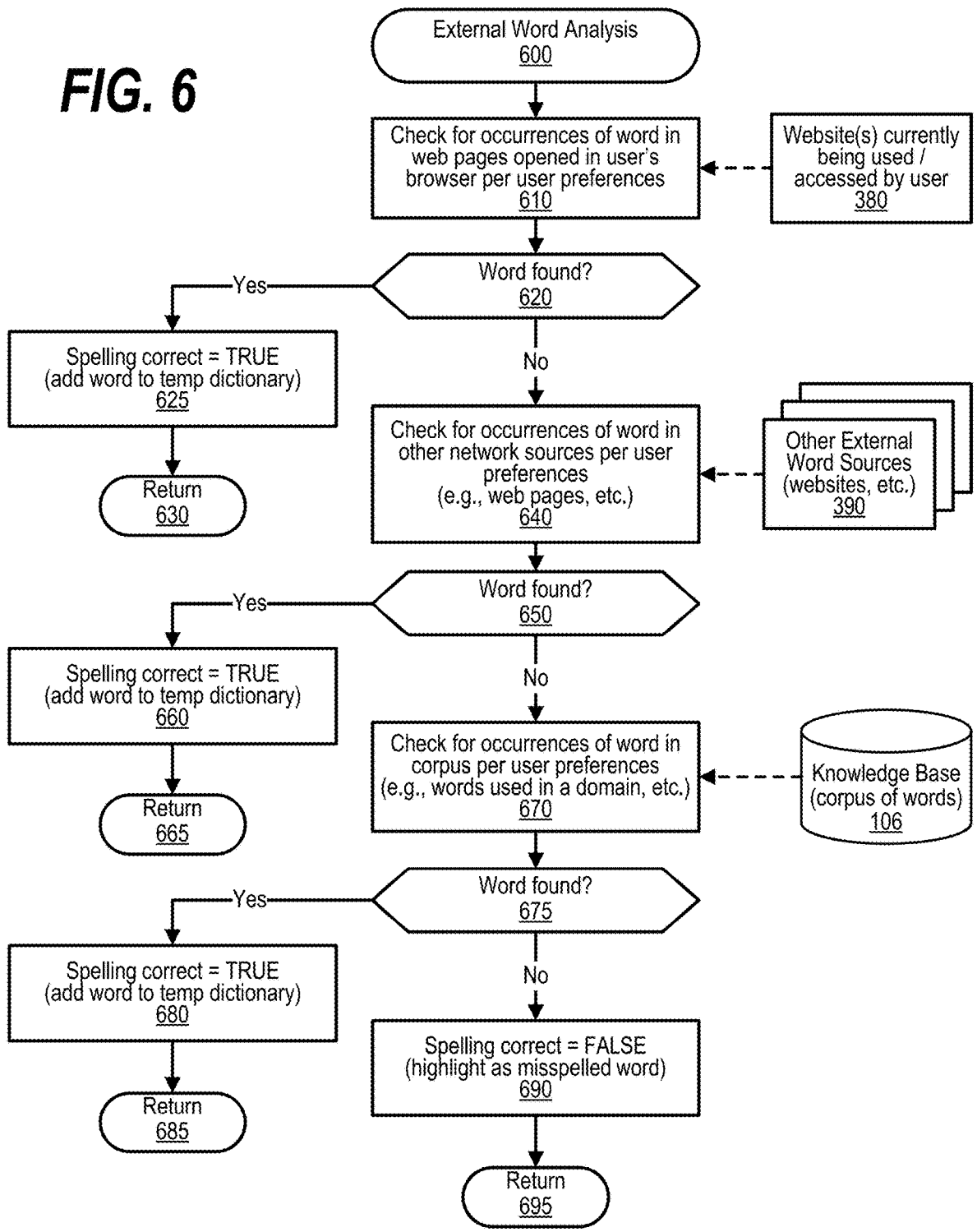
FIG. 6 is a depiction of a flowchart showing the logic used by a process that performs an external word analysis.

At predefined process 480, the process performs the External Word Analysis routine (see FIG. 6 and corresponding text for processing details). This routine also might store the word entered by the user into temporary dictionary 360. The process then determines as to whether the external analysis reveals that the word entered by the user is a correctly spelled word (decision 490). If the external analysis reveals that the word is a correctly spelled word, then decision 490 branches to the 'yes' branch which loops back to wait for the user to enter the next word or exit the application. On the other hand, if the external analysis does not reveal that the word is correctly spelled, then decision 470 branches to the 'no' branch whereupon, at step 495, the process highlights the word as a misspelled word. Processing then loops back to step 410 to wait for the user to enter another word or for the user to exit the application.

FIG. 5 is a depiction of a flowchart showing the logic used by a process that performs an internal word analysis. FIG. 5 processing commences at 500 and shows the steps taken by a process that performs an internal word analysis. At step 510, the process checks for previous occurrences of the word in the document. The process determines as to whether previous occurrences of the word were found in the document (decision 520). If previous occurrences of the word were found in the document, then decision 520 branches to the 'yes' branch whereupon, at step 525, the process sets a flag for multiple same words=TRUE. On the other hand, if previous occurrences of the word were not found in the document, then decision 520 branches to the 'no' branch bypassing step 525.

At step 530, the process checks any local sources for other uses of the word. These other sources might include other email messages written by the user, other contacts, documents, or other sources from local system 540, or even a knowledge base of unusual words previously ingested by a QA system and stored in corpus 106. The process determines as to whether the word was found in other local sources (decision 545). If the word was found in other local sources, then decision 545 branches to the 'yes' branch whereupon, at step 550, the process sets a flag of spelling correct=TRUE (e.g., adds the word to the temporary dictionary, etc.), and processing returns to the calling routine (see FIG. 4) at 555. On the other hand, if the word was not found in other local sources, then decision 545 branches to the 'no' branch and processing continues.

At step 560, the process sets the flag of spelling correct=FALSE to indicate that, so far, the word is deemed to be spelled incorrectly. At step 565, the process checks local sources for uses of similar (but different) spelled words (e.g., contact name spelled slightly different, etc.). The process determines as to whether one or more similar, but differently spelled words were found in local data sources (decision 570). If similar words were found, then decision 570 branches to the 'yes' branch whereupon, at step 575, the process highlights the set of similar but differently spelled words according to user's preferences (e.g., emphasize more than typical misspelled words, etc.), and process returns to the calling routine (see FIG. 4) at 580. On the other hand, if no similar words were found, then decision 570 branches to the 'no' branch for further processing.

The process determines as to whether the flag for multiple same words has been set to TRUE (decision 585). If the flag for multiple same words has been set to TRUE, then decision 585 branches to the 'yes' branch whereupon, at step 590, the process highlights the set of same words according to the user's preferences and possibly adds the word to the temporary dictionary (e.g., highlight the set of words differently than normal misspelled words, etc.). On the other hand, if the flag for multiple same words has not been set to TRUE, then decision 585 branches to the 'no' branch bypassing step 590. Processing then returns to the calling routine (see FIG. 4) at 595.

FIG. 6 is a depiction of a flowchart showing the logic used by a process that performs an external word analysis. FIG. 6 processing commences at 600 and shows the steps taken by a process that performs an external word analysis. At step 610, the process checks for occurrences of the word in web pages 380 opened in the user's browser with the checking performed per user preferences. The process determines as to whether the word was found in these web pages (decision 620). If the word was found in these web pages, then decision 620 branches to the 'yes' branch whereupon, at step 625, the process sets the flag indicating that spelling correct=TRUE (e.g., adds the word to the temporary dictionary, etc.), and processing returns to the calling routine (see FIG. 4) at 630. On the other hand, if the word was not found in these web pages, then decision 620 branches to the 'no' branch and processing continues.

At step 640, the process checks for occurrences of the word in other network electronic document sources 390 per the user preferences (e.g., web pages in a particular field of study, etc.). The process determines as to whether the word was found in these external sources (decision 650). If the word was found in these external sources, then decision 650 branches to the 'yes' branch whereupon, at step 660, the process sets the flag indicating that the spelling correct=TRUE (e.g., adds the word to the temporary dictionary, etc.), and processing returns to the calling routine (see FIG. 4) at 665. On the other hand, if the word was not found in these external sources, then decision 620 branches to the 'no' branch and processing continues.

At step 670, the process checks for occurrences of the word in corpus 106 per the user's preferences (e.g., words ingested by a QA system that are used in a particular domain, etc.). The process determines as to whether the word was found in the corpus (decision 675). If the word was found in the corpus, then decision 650 branches to the 'yes' branch whereupon, at step 660, the process sets the flag indicating that the spelling correct=TRUE (e.g., adds the word to the temporary dictionary, etc.), and processing returns to the calling routine (see FIG. 4) at 680. On the other hand, if the word was not found in corpus 106, then decision 620 branches to the 'no' branch whereupon, at step 690, the process sets the flag for spelling correct=FALSE (e.g., highlights the word as a misspelled word, etc.), and processing returns to the calling routine (see FIG. 4) at 695.

Figure 7:
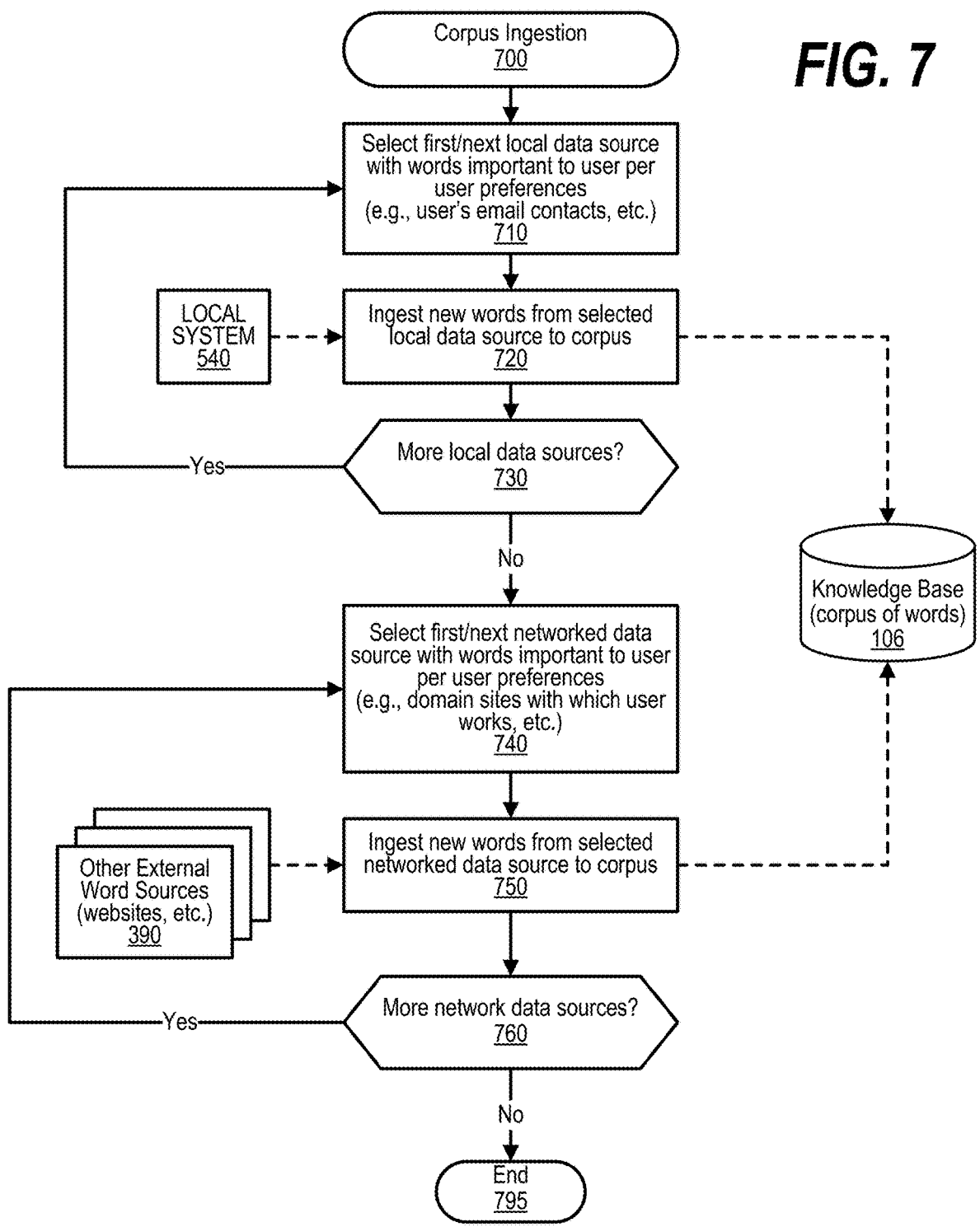
FIG. 7 is a depiction of a flowchart showing the logic used by a routine that ingests word data into a corpus of a QA system that is utilized by the spell checking application.

FIG. 7 is a depiction of a flowchart showing the logic used by a routine that ingests word data into a corpus of a QA system that is utilized by the spell checking application. FIG. 7 processing commences at 700 and shows the steps taken by a process that ingests words into a corpus for use by the spellchecking application. At step 710, the process selects the first local data source with words that are important to user per the user's preferences (e.g., user's email contacts, etc.). At step 720, the process ingests new words from selected local data source found on local system 540 into corpus 106. The process determines as to whether there are more local data sources from which to find words (decision 730). If there are more local data sources to process, then decision 730 branches to the 'yes' branch which loops back to step 710 to select and process words from the next local data source. This looping continues until all of the local data sources have been processed, at which point decision 730 branches to the 'no' branch exiting the loop.

At step 740, the process selects the first networked (non-local) data source with words that are important to the user per the user's preferences (e.g., domain web sites in a field of study in which the user works, etc.). At step 750, the process ingests the new words from the selected networked data source into corpus 106. The process determines as to whether there are more network data sources to process (decision 760). If there are more network data sources to process, then decision 760 branches to the 'yes' branch which loops back to step 740 to select and process words from the next network data source. This looping continues until all of the network data sources have been processed, at which point decision 760 branches to the 'no' branch exiting the loop. The ingestion process thereafter ends at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a plurality of words input by a user of an application, wherein the plurality of words are displayed on a display device;
   comparing each of the plurality of words to a first set of words in a dictionary;
   based on the comparing:
      selecting a first word from the plurality of words;
      in response to determining that a single occurrence of the first word is identified in the plurality of words and the first word is not present in the dictionary, determining that the first word is misspelled;
      selecting a second word from the plurality of words;
      in response to determining that a plurality of occurrences of the second word are identified in the plurality of words and the second word is not present in the dictionary, determining that the second word is a possible misspelled word;
      highlighting, on the display device, the first word using a first highlight; and
      highlighting, on the display device, the second word using a second highlight that is different from the first highlight.

2. The method of claim 1 further comprising:
   retrieving a plurality of electronic data sources; and
   searching the plurality of electronic data sources for the first and second words, wherein the plurality of words includes a second set of words from the plurality of electronic data sources and wherein the plurality of occurrences of the second word are found in one or more of the electronic data sources.

3. The method of claim 1 further comprising:
   selecting a third word from the plurality of words;
   in response to determining that the third word is substantially similar to the second word, a single occurrence of the third word is identified in the plurality of words, and the third word is not present in the dictionary, determining that the third word is a possible misspelled word; and highlighting, on the display device, the third word using a third highlight that is different from the first and second highlights.

4. The method of claim 1 further comprising:

selecting a third word from the plurality of words, wherein the third word is not present in the dictionary;

accessing one or more non-dictionary electronic data sources;

searching a second set of words found in the non-dictionary electronic data sources for the third word;

inhibiting highlighting of the third word in response to the searching finding the third word in the second set of words; and highlighting the third word in response to the searching failing to find the third word in the second set of words.

5. The method of claim 4 further comprising:

highlighting the third word using the first highlight in response to a single occurrence of the third word being received from the user; and highlighting the third word using the second highlight in response to a plurality of occurrences of the third word being received from the user.

6. The method of claim 4 further comprising:

retrieving the second set of words from a corpus used by a machine learning system.

7. The method of claim 6 further comprising:

ingesting the non-dictionary electronic sources into the corpus prior to receiving the plurality of words from the user.

\* \* \* \* \*